United States Patent [19]

Takata et al.

[11] Patent Number: 4,702,767

[45] Date of Patent: Oct. 27, 1987

[54] METHOD OF PURIFYING A BEARING STEEL

[75] Inventors: Yatsuka Takata, Chita; Tadamasa Yamada, Nagoya; Eiki Kikuchi, Tokai, all of Japan

[73] Assignees: Aichi Steel Works, Ltd., Aichi; Koyo Seiko Kabushiki Kaisha, Osaka, both of Japan

[21] Appl. No.: 882,383

[22] Filed: Jul. 7, 1986

Related U.S. Application Data

[62] Division of Ser. No. 707,820, Mar. 4, 1985, Pat. No. 4,642,219.

[30] Foreign Application Priority Data

Mar. 14, 1984 [JP] Japan .................................. 59-50073

[51] Int. Cl.⁴ ................................................ C21C 7/10
[52] U.S. Cl. ........................................ 75/49; 75/10.46
[58] Field of Search ................................ 75/49, 10.46

[56] References Cited

U.S. PATENT DOCUMENTS

| | | | |
|---|---|---|---|
| 3,206,301 | 4/1965 | Daubersy | 75/49 |
| 3,467,167 | 9/1969 | Mahin | 75/49 |
| 3,632,096 | 1/1972 | Perry | 75/49 |

*Primary Examiner*—Peter D. Rosenberg
*Attorney, Agent, or Firm*—Oblon, Fisher, Spivak, McClelland, & Maier

[57] ABSTRACT

A high-quality bearing steel contains 0.70 to 1.10% by weight of C, 0.15 to 1.60% by weight of Si, 0.15 to 1.15% by weight of Mn, 0.010% by weight or less of P, 0.002% by weight or less of S, 0.50 to 1.60% by weight of Cr, 0.015% by weight or less of Al, 0.0050% by weight or less of N, 0.0006% by weight or less of O, 0.0015% by weight or less of Ti, and the remainder of Fe together with impurities. The steel can further contain 0.05 to 0.50% by weight of Mo or a member or members selected from a group consisting of 0.05 to 0.30% by weight of V and 0.05 to 0.30% by weight of Nb. The bearing steel has an excellent durability life and cold workability.

3 Claims, No Drawings

METHOD OF PURIFYING A BEARING STEEL

This is a division of application Ser. No. 707,820, filed Mar. 4, 1985, now U.S. Pat. No. 4,642,219.

BACKGROUND OF THE INVENTION

1. Field of the Invention:

The present invention relates to a high-quality bearing steel having excellent durability life and cold workability and used for ball bearings, roller bearings and the like, and a manufacturing method therefor.

2. Description of the Prior Art:

Bearing steel must satisfy various properties including those relating to durability life, impact fatigue, cold workability and the like. In particular, durability life is becoming increasingly important with trends toward heavier loads and higher speed together with the requirements of higher performance in industrial machinery and vehicles. Studies are being made to develop a steel having higher durability life.

In order to improve durability life, a conventional method was proposed wherein the O content of the steel is decreased to reduce oxide inclusions such as $Al_2O_3$. In some applications, another conventional method was proposed which uses a special smelting method such as VAR or ESR so as to control the solid texture and to reduce the amount of non-metallic inclusions.

However, in the conventional method of simply reducing the O content of the steel, a satisfactory long durability life cannot be obtained in some applications. Again, the latter method is costly and not suitable to mass-production.

SUMMARY OF THE INVENTION

The present invention has been made in consideration of this and is based on various studies made on the influence of various alloying elements on the durability life of a resultant bearing steel. Based on such studies, it was found that alumina oxide among oxide inclusions produces large inclusions and considerably reduce the durability life. When oxide inclusions are very small, a trace amount of sulfide inclusion reduces the durability life while Ti forms a carbo-nitride, and a mere trace considerably reduces the durability life. Impurities such as P or N also adversely affect the durability life.

It is a primary object of the present invention to provide a high-quality bearing steel which has an excellent durability life: a rated life (B10) three times and an average life (B50) six times those of conventional steel, and which therefore has a durability equivalent to that of an ESR material.

It is another object of the present invention to provide a high-quality bearing steel which has a very small amount of oxide inclusions and which has an improved cold workability.

In order to achieve the above and other objects of the present invention, there is provided a high-quality bearing steel wherein the amounts of alloying elements in the steel are selected to be 0.70 to 1.10% by weight for C, 0.15 to 1.60% by weight for Si, 0.15 to 1.15% by weight for Mn, and 0.50 to 1.60% by weight for Cr, and an O content is 0.0006% which is the minimum O content that can be achieved with the current vacuum degassing scouring technique. Raw materials are selected based on strict standards to reduce the amounts of impurities which if introduced form inclusions reducing durability life. The amount of Ti is set to be 0.0015% by weight or less and the amount of Al is set to be 0.015% by weight or less, and the amount of S is reduced to 0.002% by weight or less which is considerably smaller than that in conventional steel. The amounts of impurity elements are reduced, i.e, the amount of P is reduced to 0.010% by weight or less and the amount of N is reduced to 0.0050% by weight or less so as to reduce the amount of non-metallic inclusions in the steel to 0.010% by area or lens. The average size of non-metallic inclusions is reduced to 15 μm or less.

In a method of manufacturing a highly pure bearing steel having the components described above according to the present invention, good raw materials of steel are selected, and after oxidation scouring in an electric furnace poured into a ladle. The smelted steel is subjected to dephosphorization during or after pouring into the ladle. The oxide slag on the smelted steel is absorbed and removed with a vacuum slag cleaner. A highly basic slag having a basicity of 3 or more (a reducing slag having an excellent desulfurization property such that $FeO+MnO \leqq 0.5\%$ (by weight) and $CaO/SiO_2/Al_2O_3 = 0.3$ to 0.4 is prepared by an electric furnace. Reducing refinement is performed to reduce the amount of S to 0.002% by weight or less and the amount of O to 0.0020% by weight or less and to reduce the amount of Ti while bath temperature is controlled, an inert gas is introduced through double porous bricks, and the smelted steel is agitated. Subsequently, vacuum degassing is performed by a circulating vacuum degassing apparatus such that vigorous circulating is performed during ⅔ of the total treatment time while weak circulating is performed during ⅓ of the total treatment time, thereby further reducing the amounts of O, N and H. Reducing refinement is then performed by weakly agitating the smelted steel in a reducing atmosphere at a pressure higher than normal pressure to allow minute inclusions to float and be removed. Finally, sealed casting is performed to provide the highly pure bearing steel.

DETAILED DESCRIPTION OF THE PREFERRED EMBODIMENTS

A first steel according to the present invention consists essentially of 0.70 to 1.10% by weight of C, 0.15 to 1.60% by weight of Si, 0.15 to 1.15% by weight of Mn, 0.010% by weight or less of P, 0.002% by weight or less of S, 0.50 to 1.60% by weight of Cr, 0.015% by weight or less of Al, 0.0006% by weight or less of O, 0.0050% by weight or less of N, and 0.0015% by weight or less of Ti, and the remainder being Fe and impurity elements. A second steel according to the present invention consists essentially of 0.05 to 0.50% by weight of Mo and other components of the first steel and has improved hardenability. A third steel according to the present invention consists essentially of one of V and Nb or both by 0.05 to 0.30% each by weight in addition to the components of the first steel so as to improve wear resistance. According to the method of manufacturing a bearing steel of the present invention, when the steel is prepared, slag on the smelted steel poured from a smelting furnace to a separate container (ladle) is absorbed and removed with a vacuum slag cleaner. Then, in the presence of a highly basic slag, reducing refinement is performed under conditions of strong agitation and bath temperature control. Vacuum degassing is then performed by strong and weak circulating by a circulating vacuum degassing apparatus. Next reducing refinement is performed under weak agitation in a reducing atmosphere at normal pressure.

The reasons for limiting the upper and/or lower limits of the contents of the respective components of the steel according to the present invention will be described below.

Carbon is an important element which must be included to achieve a hardness $H_RC$ of 60 or higher required for a bearing steel. Carbon must be contained in the amount of 0.70% by weight or more in order to achieve such requirement. However, when C is contained in the amount exceeding 1.10% by weight, large carbides tend to form and durability life and impact fatique are reduced. For this reason, the upper limit of C content in steel is set to be 1.10% by weight.

Silicon is an element necessary to improve deoxidation property and hardenability as well as to improve durability life and impact fatique properties. Silicon must be contained in the amount of 0.15% by weight or more. However, when Si is contained in the amount of 1.60% by weight or more, contact rolling fatigue life (hereinafter mentioned as "rolling life") characteristics are degraded. For this reason, the upper limit of the Si content in the steel is set to be 1.60% by weight.

Manganese is an element for improving deoxidation property and hardenability and must be contained in the amount of 0.15% by weight or more. However, if Mn is contained in a larger amount, the addition does not provide better effect and also produce MnS which degrades rolling life. Therefore, the upper limit of manganese contained in the steel is set to be 1.15% by weight.

Chromium is also an element for improving hardenability and for facilitating easy formation of spherical carbides. It is necessary to contain Cr in the amount of 0.50% by weight or more in order to attain such improvements. However, when Cr is contained in the amount exceeding this upper limit, the carbides become too large to degrade the cutting performance. Thus, the upper limit of the Cr content in the steel is set to be 1.60% by weight.

Phosphorus is an element which reduces rolling life and toughness and must be restricted to the smallest amount possible. The upper limit of P contained in the steel is set to be 0.010% by weight.

Sulfur is an element which forms a sulfide inclusion with Mn and considerably degrades the durability life. The primary objects of the present invention are to reduce the sulfide inclusion and to considerably improve the durability life. The amount of S contained in the steel must be precisely controlled and its upper limit is set to be 0.002% by weight.

Aluminum is an element which produces a hard oxide inclusion such as $Al_2O_3$ which degrades steel cutting performance and rolling life characteristics. The amount of Al contained in the steel therefore must be reduced to a minimum, and its upper limit is set to be 0.015% by weight.

Oxygen is an element which produces oxide inclusions such as $Al_2O_3$ or $SiO_2$ and considerably degrades the rolling life characteristic. According to the present invention, the amount of non-metallic inclusions is reduced considerably and the inclusion size is controlled so that the rolling life characteristic is improved. Thus, the amount of O contained in the steel must be strictly controlled. The upper limit of O contained in the steel is set to be 0.0006% by weight which is a minimum amount achievable with a currently available vacuum degassing scouring technique.

Nitrogen is an element which forms a nitride such as TiN and degrades the rolling life characteristic. The N content in the steel must be set to a minimum, and its upper limit is set to be 0.0050% by weight.

Titanium is an element which remains in the steel in the form a TiN inclusion. When Ti is contained in a large amount in the steel, it forms large inclusions and considerably degrades the rolling life characteristic. Therefore, the amount of Ti contained in the steel must be reduced to a minimum and its upper limit is set to be 0.0015% by weight.

Molybdenum is an element for improving the steel hardenability. When Mo is contained in a small amount in the steel, hardenability is improved. According to the present invention, Mo is contained in the amount of 0.05% by weight or more, if necessary. However, since Mo is an expensive element and addition thereof in an amount exceeding 0.50% by weight does not provide an equivalent good result, the upper limit of Mo content in the steel is set to be 0.50% by weight.

Vanadium and niobium are elements for improving steel strength and toughness by forming carbo-nitride. In the present invention, it is necessary to contain V and/or Nb in the steel in the amounts of 0.05% by weight or more, respectively, to obtain desired effects, if it is desired. However, even if these elements are contained in amounts exceeding this upper limit, the effect of addition is small. Therefore, the upper limits for these elements are se to be 0.30% by weight.

The characteristic features of the steel of the present invention will be described by way of examples in comparison with those of conventional steels.

Table 1 shows the chemical components of sample steel.

TABLE 1

| | Chemical Composition (wt %) | | | | | | | | | | | | | | |
|---|---|---|---|---|---|---|---|---|---|---|---|---|---|---|---|
| | C | Si | Mn | P | S | Cu | Ni | Cr | Al | O | N | Ti | Mo | V | Nb |
| A | 0.98 | 0.28 | 0.47 | 0.016 | 0.012 | 0.13 | 0.06 | 1.46 | 0.024 | 0.0012 | 0.0051 | 0.0030 | | | |
| B | 0.96 | 0.60 | 1.01 | 0.014 | 0.013 | 0.14 | 0.06 | 1.11 | 0.023 | 0.0013 | 0.0045 | 0.0029 | | | |
| C | 0.96 | 0.27 | 0.49 | 0.010 | 0.007 | 0.08 | 0.08 | 1.47 | 0.0018 | 0.0006 | 0.0052 | 0.0032 | | | |
| D | 0.98 | 0.28 | 0.46 | 0.012 | 0.003 | 0.05 | 0.06 | 1.49 | 0.0015 | 0.0010 | 0.0047 | 0.0017 | | | |
| E | 0.77 | 0.28 | 0.46 | 0.010 | 0.009 | 0.09 | 0.05 | 1.46 | 0.0019 | 0.0007 | 0.0049 | 0.0012 | | | |
| F | 0.82 | 0.30 | 0.47 | 0.007 | 0.002 | 0.05 | 0.08 | 1.51 | 0.0013 | 0.0005 | 0.0049 | 0.0013 | | | |
| G | 0.82 | 0.67 | 1.03 | 0.009 | 0.002 | 0.08 | 0.10 | 1.16 | 0.0015 | 0.0005 | 0.0047 | 0.0012 | | | |
| H | 0.97 | 0.28 | 0.47 | 0.009 | 0.002 | 0.07 | 0.09 | 1.47 | 0.0012 | 0.0005 | 0.0045 | 0.0014 | | | |
| J | 0.98 | 0.62 | 0.96 | 0.007 | 0.002 | 0.04 | 0.08 | 1.07 | 0.0010 | 0.0005 | 0.0047 | 0.0011 | | | |
| K | 0.97 | 0.27 | 0.46 | 0.008 | 0.002 | 0.05 | 0.06 | 1.49 | 0.0012 | 0.0005 | 0.0042 | 0.0011 | 0.15 | | |
| L | 0.97 | 0.29 | 0.51 | 0.008 | 0.002 | 0.09 | 0.08 | 1.46 | 0.003 | 0.0005 | 0.0042 | 0.0012 | | 0.11 | |
| M | 0.77 | 0.29 | 0.47 | 0.007 | 0.002 | 0.05 | 0.08 | 1.46 | 0.0012 | 0.0005 | 0.0045 | 0.0010 | | | 0.13 |
| N | 0.96 | 0.60 | 1.05 | 0.009 | 0.002 | 0.12 | 0.05 | 1.15 | 0.0012 | 0.0005 | 0.0049 | 0.0011 | | 0.10 | 0.12 |

In Table 1, steels A and B are conventional steels (steel A: SUJ2; steel B: SUJ3), steels C to E are comparative steels, steel D is prepared by ESR, and steels F to N are steels of the present invention.

Table 2 shows the results of an experiment for determining the amount and average length of non-metallic inclusions, durability life, and cold workability for the sample steels presented in Table 1 when these sample steels were hardened by oil cooling under conditions of 850° C.×30 minutes, tempered under conditions of 170° C.×90 minutes, and then air cooled.

The amount and average length of non-metallic inclusions were tested by cutting rolled bars of 65 mm diameter from the steel subjected to the above treatments. The amount and average length of non-metallic inclusions in each steel are represented comparatively with the length of non-metallic inclusions of steel D as an ESR material which is hypoth size unit. The durability life was tested using a Mori-type durability life tester. Sample pieces having an outer diameter of 65 mm, an inner diameter of 18 mm, and a thickness of 10 mm were prepared. The durability life is also represented comparatively with the length of non-metallic inclusions of steel D. The cold workability was examined in terms of cracking rate at an upsetting rate of 75% (20 mm diameter and 30mm length).

TABLE 2

| | Non-metallic Inclusion | | Durability Life | | Cold Workability |
|---|---|---|---|---|---|
| | Amount JIS (A + B + C) | Average Length (μm) | $B_{10}$ Life | $B_{50}$ Life | Cracking Rate (%) |
| A | 3.4 | 2.0 | 0.37 | 0.15 | 18 |
| B | 3.2 | 2.0 | 0.36 | 0.15 | 50 |
| C | 2.4 | 1.6 | 0.39 | 0.16 | 11 |
| D | 1.0 | 1.0 | 1.0 | 1.0 | 0 |
| E | 2.3 | 1.6 | 0.51 | 0.18 | 15 |
| F | 0.25 | 1.0 | 1.29 | 1.10 | 0 |
| G | 0.25 | 1.0 | 1.26 | 1.09 | 0 |
| H | 0.25 | 1.0 | 1.07 | 1.01 | 0 |
| J | 0.25 | 1.0 | 1.05 | 1.0 | 0 |
| K | 0.50 | 1.0 | 1.01 | 1.0 | 0 |
| L | 0.50 | 1.0 | 1.06 | 1.0 | 0 |
| M | 0.50 | 1.0 | 1.06 | 1.0 | 0 |
| N | 0.50 | 1.0 | 1.0 | 1.0 | 0 |

As can be seen from Table 2, the non-metallic inclusions of the conventional steels A and B have amounts which are three times those of the steel D as an ESR material having a controlled solid texture and also have average lengths which are twice those of the steel D. The conventional steels A and B have the durability life ⅓ that of steel D in terms of rated life and of about 1/6 that of steel D in terms of average life. As for the cold workability, the steels A and B have high cracking rates. Thus, the steels A and B are inferior in terms of non-metallic inclusions, durability life, and cold workability.

The steel C as a comparative steel is slightly improved as to amount and average length of non-metallic inclusions compared with the conventional steels due to the low S and O contents. However, the steel D has the amount of non-metallic inclusions which is 2.4 times that of the steel D, and the average length of non-metallic inclusions which is 1.6 times that of the steel D. The steel C has a durability equivalent to the conventional steels A and B. The steel E as another comparative steel is also inferior in terms of non-metallic inclusion amount and average length, and durability life, as in the case of the steel C.

In constrast to this, in the steels F to N of the present invention, since the O content is 0.0006% by weight or less and the S content is 0.0002% by weight or less and since the Ti, Al and N contents are reduced to a minimum, they have an amount of non-metallic inclusions which is ¼ that of the steel D as an ESR material, an average length of the non-metallic inclusions equivalent to the steel D, a durability life equvalent to that of the steel D in terms of rated and average lives, and a better cold workability than those of the conventional steels A and B. In this manner, the steels F to N according to the present invention exhibit better performance as to the non-metallic inclusions, and equivalent durability life and cold workability compared to the steel D as an ESR material which has an improved internal quality due to controlled solid texture.

In the steel according to the present invention, the S content is as low as 0.002% by weight or less. However, since the amount of oxide inclusions is considerably reduced, machinability equivalent to the conventional steels is obtained.

As can be seen from the above, in the steel of the present invention, C, Si, Mn and Cr are contained in proper amounts, and P, S, O and Ti contents are reduced to a minimum so as to reduce the amounts of oxide and sulfide inclusions in the steel. Thus, the steel according to the present invention has an excellent durability life, a rated life three times and an average life six times those of conventional steels, and also has an excellent cold workability. The present invention thus provides a high-quality bearing steel suitable for use in ball bearings or roller bearings in high-load and high-speed industrial machinery or vehicles, and a method of manufacturing thereof.

What is claimed as new and desired to be secured by Letters Patent of the United States is:

1. In a method of purifying a bearing steel consisting essentially of carbon, silicon, manganese, phosphorus, sulfur, chromium, aluminum, oxygen, nitrogen and titanium, the remainder being iron together with impurities, the method comprising:
 (i) smelting the bearing steel in a smelting furnace in order to oxidatively scour the steel;
 (ii) pouring the smelted steel into a separate container, performing dephosphorization of the smelted steel and absorbing and removing slag which contains oxide from the steel which floats on top of the smelted steel with a vacuum slag cleaner;
 (iii) conducting reducing refinement of the steel by strongly agitating the smelted steel in the presence of a highly basic slag which has a basicity of not less than 3 while adjusting the temperature of the steel bath, said refinement occurring under an inert atmosphere which is under a pressure greater than normal pressure;
 (iv) performing vacuum degassing of the steel with a circulating vacuum degassing apparatus which imparts strong circulation during two-thirds of the treatment, and weak circulation during one-third of the treatment; and
 (v) performing a reducing refinement on the steel by weakly agitating the smelted steel in a reducing atmosphere at normal pressure, said treatment thereby reducing the amounts of phosphorus, sulfur, aluminum, oxygen, nitrogen and titanium to not more than 0.01%, not more than 0.002%, not more than 0.015%, not more than 0.0006%, not more than 0.005% and not more than 0.0015% by weight respectively.

2. The method according to claim 1, wherein said first step (i) comprises smelting said bearing steel in an electric furnace thereby oxidatively refining the steel, and wherein the highly basic slag employed in step (iii) contains a total amount of FeO and MnO which is not more than 0.5% by weight and contains a composition of $CaO/SiO_2/Al_2O_3$ of 0.3 to 0.4.

3. The method of claim 1, wherein said bearing steel consists essentially of 0.70 to 1.10% by weight carbon, 0.15 to 1.6% by weight silicon, 0.15 to 1.15% by weight manganese, not more than 0.010% by weight phosphorus, not more than 0.002% by weight sulfur, 0.50 to 1.60% by weight chromium, not more than 0.015% aluminum, not more than 0.0006% by weight oxygen, not more than 0.0050% by weight nitrogen and not more than 0.0015% by weight titanium.

* * * * *